Patented June 23, 1936

2,044,954

UNITED STATES PATENT OFFICE 2,044,954

ALKALINE EARTH METAL SULPHATE

George A. Peirce, Roselle, N. J., assignor to The Grasselli Chemical Company, Cleveland, Ohio, a corporation of Delaware No Drawing. Application July 11, 1934, Serial No. 734,690

13 Claims. (Cl. 23—122)

The present invention relates to pigments, particularly alkaline earth metal sulphates of fine particle size and to processes of making the same.

The novel process of my invention comprises in its broadest aspect precipitating jointly an alkaline earth metal sulphate and a small amount of another water insoluble alkaline earth metal salt, and in one of its preferred embodiments my invention also comprises effecting this joint precipitation in the presence of an organic colloidal dispersing agent, which may optionally be a compound which also precipitates an insoluble alkaline earth metal compound.

The products made according to the novel process of my invention are of exceedingly fine particle size, they contain only small amounts of agglomerates and are particularly distinguished by ease of dispersibility in organic substances such as used for making plastic and coating compositions.

The insoluble alkaline earth metal compounds which I found particularly beneficial for use in my invention are their fatty acid or rosin soaps, or salts of organic acids such as sulphates or acid-sulphuric acid esters, sulphonates, etc. of high molecular aliphatic hydrocarbons and alcohols and among inorganic derivatives the alkaline earth metal phosphates.

The results of my work have lead me to believe that when small amounts of such insoluble alkaline earth metal salts are precipitated jointly with the alkaline earth metal sulphates, these accessory salts attach themselves to the originally formed sulphate particles and thereby prevent particle growth. It is sometimes desirable to also prevent agglomeration of the sulphate particles formed in this manner and to this effect I add to the reaction medium a dispersing agent, such as glue, gelatine, casein, sulphite cellulose waste or other high molecular non-crystalline organic substances which are water soluble.

I further found that an increased beneficial result is obtained if the precipitation of the alkaline earth metal sulphate is effected in the presence of both a phosphate radical or anion and the radical or anion of a soap forming acid, such as fatty, rosin acids or sulphuric acid derivatives of high molecular hydrocarbon radicals and alcohols. I am unable to state if in this instance insoluble alkaline earth metal phosphates as well as insoluble soaps are precipitated or if the phosphate radical has still another effect on the formation of the insoluble sulphates. From all experimental evidence available it would appear that the presence of the phosphate radical influences the action of the organic radical or vice versa, when both are present at the time the alkaline earth metal sulphate is precipitated: the combined action of the two appears different or greater than the effect one would expect of the mere addition of the two. In this particular embodiment of my invention I can also add to the reaction mixture a dispersing agent and obtain products of very fine particle size and easy dispersion in rubber or other organic plastic materials.

In the concrete performance of my novel process I provide a solution of a barium compound, and a solution of a sulphate, to this latter solution I add a small amount of a compound the cation of which will form an insoluble alkaline earth metal salt and, if desired, I also add to this solution a small amount of a dispersing agent. I then mix the two solutions.

The alkaline earth metal sulphate precipitate is separated from the mother liquor and recovered in well known manners.

The principle of this operation is based on the metathetical reaction between a soluble alkaline earth metal compound and a soluble sulphate.

My novel process is applicable to the formation of barium, calcium or strontium sulphates of improved particle size characteristics. The barium sulphate produced by this process is particularly useful as a filler for rubber where in comparison with ordinary blanc fixe the vulcanites show improved physical properties.

For introduction of the phosphate ion into my reaction mixture I can add to the solution of the sulphate ion any of the soluble alkali metal phosphates or their molecular dehydration products, such as pyro- and metaphosphates.

As a general rule I might state that the various addition agents used by me should be present in amounts not exceeding 5% of the alkaline earth metal sulphate produced in my reaction.

To illustrate my invention I am giving below several examples of how I prepared barium sulphate under various embodiments of my invention.

*Example 1.*—This describes a preparation of blanc fixe whereby a product of very fine particle size is obtained.

This method differs from commonly used processes for making pigment grade blanc fixe in that the reaction is carried out at lower temperature and in more dilute solutions.

A 20° Bé. solution of barium sulphide at 100° F. was run into 30 lbs. of a 25° Bé. solution of sodium sulphate at 100° F. in 30 minutes. The addition of barium sulphide was stopped at the point where a test sample from the strike showed no excess of either barium sulphide or sodium sulphate. The total amount of 20° Bé. barium sulphide solution added was 54 lbs. The final strike temperature was 97° F. The slurry was washed by decantation practically free from soluble sulphides and the blanc fixe filtered off, dried and ground. The yield of dry blanc fixe was 10.5 lbs.

The process of this example is given for comparative purposes only; it is not embraced within the scope of the claims.

*Example 2.*—Same procedure as Example 1 except 23 grams of meta phosphate (approximately .5% of the blanc fixe yield) was added to the 25° Bé. solution of sodium sulphate at 100° F. just prior to the addition of the barium sulphide solution.

*Example 3.*—Same procedure as Example 1 except a soap solution was added to the sodium sulphate solution just prior to the addition of the barium sulphide solution. The soap solution was made up by adding 45 grams of fatty acids (principally stearic with some oleic) to 1500 cc. of boiling water and saponifying this with 9 grams of caustic. The soap solution containing approximately 3% sodium stearate or 1.0% of the blanc fixe yield.

*Example 4.*—Same procedure as Example 3 except the soap solution was made up with the addition of 23 grams of meta-phosphate dissolved in the boiling water.

*Example 5.*—Same procedure as Example 3 except the soap solution was made up with the addition of 23 grams of meta-phosphate and 9 grams of dried sulphite cellulose waste (approximately .2% on the blanc fixe yield) dissolved in the boiling water.

It will be seen that in Example 2 sodium meta-phosphate was added to the reaction mixture as the agent which furnishes the anion which can precipitate an insoluble barium compound.

In Example 3 a fatty acid furnishes this anion.

In Example 4 both a phosphate and a fatty acid anion are present in the reaction mixture and in Example 5 a dispersing agent is added to the reaction mixture of Example 4.

The products of these five examples were tested in the following rubber stock:

| | |
|---|---:|
| Pale crepe | 50.0 |
| Smoked sheet | 50.0 |
| Zinc oxide | 6.0 |
| Sulphur | 2.5 |
| Stearic acid | 1.0 |
| D. P. G. | 0.75 |
| Blanc fixe | 91.5 |

The physical tests of the cured stocks are summarized in the following table:

| | Minutes cure at 287° F. | | | |
|---|---|---|---|---|
| | 15 | 30 | 45 | 60 |
| *Ultimate tensile lb./sq. in.* | | | | |
| Commercial blanc fixe | 2475 | 3425 | 3625 | 3550 |
| Blanc fixe of Example 1 | 2900 | 3375 | 3675 | 3550 |
| Blanc fixe of Example 2 | 3375 | 3850 | 3750 | 3775 |
| Blanc fixe of Example 3 | 3350 | 3825 | 3775 | 4050 |
| Blanc fixe of Example 4 | 3425 | 3825 | 4050 | 3750 |
| Blanc fixe of Example 5 | 3325 | 4075 | 4275 | 4025 |
| *Modulus—500% elong. lb./sq. in.* | | | | |
| Commercial blanc fixe | 850 | 1250 | 1425 | 1525 |
| Blanc fixe of Example 1 | 850 | 1250 | 1475 | 1525 |
| Blanc fixe of Example 2 | 1150 | 1500 | 1700 | 1800 |
| Blanc fixe of Example 3 | 1025 | 1250 | 1575 | 1625 |
| Blanc fixe of Example 4 | 1025 | 1325 | 1525 | 1650 |
| Blanc fixe of Example 5 | 1050 | 1325 | 1600 | 1675 |
| *Ultimate elongation per cent* | | | | |
| Commercial blanc fixe | 740 | 720 | 700 | 690 |
| Blanc fixe of Example 1 | 760 | 720 | 720 | 680 |
| Blanc fixe of Example 2 | 760 | 720 | 700 | 680 |
| Blanc fixe of Example 3 | 780 | 780 | 720 | 700 |
| Blanc fixe of Example 4 | 780 | 760 | 740 | 690 |
| Blanc fixe of Example 5 | 770 | 760 | 720 | 720 |

In making up the rubber stocks tested as above it was noted that the product of Example 1 gave a poor dispersion, the blanc fixe of Example 2 gave a better dispersion, which was still better with the products of Examples 3, 4 and 5.

The standard tear test shows also that the blanc fixe of Example 5 had the best tear resistance, whereas the commercial product was poorest.

It will also be realized that a distinctive improvement of the physical characteristics is shown for the rubber stocks containing the products of my novel process, the blanc fixe of Example 5 giving the highest tensile strength at optimum cure without decreasing the ultimate elongations. In fact the elongation is actually higher at each cure indicating a more "stretchy" stock.

The above examples are given for illustrative purposes only and should in no way be considered as limiting my invention.

My novel process is applicable also to the formation of calcium or strontium sulphate and instead of barium sulphid and sodium sulphate I can also use the chlorides, nitrates, etc. of calcium, barium or strontium and use potassium sulphate, sulphuric acid, etc. as the compound furnishing the sulphate anion.

Similarly I can successfully use mono-, di- or trisodium, or potassium phosphate, pyrophosphate or other alkali or ammonium phosphates for furnishing the phosphate radical or use other dispersing agent, such as gelatine, glue, albuminoid substances as the dispersing agent.

Instead of the soaps used in the above examples I can use other fatty acid, or rosin compounds or the sulphonates and acid sulphate esters of glycerids or of high carbon chain aliphatic alcohols or hydrocarbons provided they form water insoluble alkaline earth metal salts.

I claim:

1. In a metathetical reaction between a soluble alkaline earth metal compound and a soluble sulphate, the step of effecting the precipitation of the alkaline earth metal sulphate in the presence in the reaction mixture of a dispersing agent and a small amount of an anion other than SO$_4$ which forms a water insoluble alkaline earth metal sulphate.

2. The process of claim 1 in which said dispersing agent is a water soluble soap.

3. The process of claim 1 in which said anion, other than SO$_4$ is a phosphate ion.

4. The process of claim 1 in which said alkaline earth metal is barium.

5. The process of precipitating an alkaline earth metal sulphate which comprises mixing an aqueous solution of an alkaline earth metal compound and an aqueous solution containing the SO$_4$ radical, said aqueous solution of the SO$_4$ radical containing in addition a small amount of a water soluble soap and a small amount of a water soluble phosphate.

6. The process of claim 5 in which the aqueous solution of the sulphate radical contains in addition and a dispersing agent.

7. The process of claim 1 in which said alkaline earth metal sulphate is barium and said dispersing agent is a water soluble soap.

8. The process of claim 1 in which said alkaline earth metal is barium and said anion, other than SO$_4$ is a phosphate ion.

9. The process of claim 1 in which said alkaline earth metal is barium, said dispersing agent is a water soluble soap and said ion, other than SO₄, is a phosphate ion.

10. In a metathetical reaction between a soluble barium compound and a soluble sulphate, the step of effecting the precipitation of barium sulphate in the presence in the reaction medium of a phosphate ion, a water soluble soap and an organic, colloidal dispersing agent.

11. The process of claim 10 in which said phosphate ion is the anion of a metaphosphate.

12. The process of claim 10 in which said dispersing agent is sulphite cellulose waste.

13. The process of precipitating barium sulphate which comprises mixing an aqueous solution of barium sulphid with an aqueous solution of sodium sulphate, said latter solution containing a small amount of a water soluble fatty acid soap, a small amount of sodium meta-phosphate and a small amount of sulphite cellulose waste.

GEORGE A. PEIRCE.